(12) United States Patent
Iwanaga (10) Patent No.: US 7,500,089 B2
(45) Date of Patent: Mar. 3, 2009

(54) SIMD PROCESSOR WITH EXCHANGE SORT INSTRUCTION OPERATING OR PLURAL DATA ELEMENTS SIMULTANEOUSLY

(75) Inventor: Kazuhiko Iwanaga, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1318 days.

(21) Appl. No.: 10/113,766

(22) Filed: Apr. 1, 2002

(65) Prior Publication Data

US 2002/0174325 A1  Nov. 21, 2002

(30) Foreign Application Priority Data

Apr. 2, 2001 (JP) ............................ 2001-103145

(51) Int. Cl.
*G06F 7/22* (2006.01)
(52) U.S. Cl. ...................... 712/300; 708/207
(58) Field of Classification Search .............. 708/207; 712/300
See application file for complete search history.

(56) References Cited

U.S. PATENT DOCUMENTS 4,734,877 A * 3/1988 Sakata et al. ................ 708/441

FOREIGN PATENT DOCUMENTS

| JP | 05002645 | 1/1993 |
| JP | 06274617 | 9/1994 |
| JP | 8-30577 | 2/1996 |
| JP | 11149554 | 6/1999 |

OTHER PUBLICATIONS

Webster's Ninth New Collegiate Dictionary, Merriam-Webster, Inc., 1990, pp. 607.*
Wikipedia printout for definition of "SIMD", en.wikipedia.org/wiki/SIMD, pp. 1-5.*
Rosenberg, Jerry M., Dictionary of Computers, Information Processing & Telecommunications, second edition, 1987, definition for term "shift", pp. 572.*

* cited by examiner

*Primary Examiner*—Richard Ellis
(74) *Attorney, Agent, or Firm*—Cooper & Dunham, LLP (57) ABSTRACT

An SIMD type microprocessor having a plurality of processor elements, wherein data stored in a specific register included in each processor element and data stored in an operand-designated source register are compared based on a first type of instruction; after the comparison, a larger data is stored in the specific register; and a smaller data is stored in the source register or an operand-designated destination register other than the source register.

7 Claims, 11 Drawing Sheets

SIMD PROCESSOR WITH EXCHANGE SORT INSTRUCTION OPERATING OR PLURAL DATA ELEMENTS SIMULTANEOUSLY

BACKGROUND OF THE INVENTION

1. Field of the Invention

The present invention relates to an SIMD (Single Instruction-stream Multiple Data-stream) type microprocessor.

2. Description of the Related Art

In SIMD microprocessors, one instruction can simultaneously perform the same operation processing on a plurality of data. Because of this performance, such microprocessors are frequently utilized in processing such as image processing in which the same operations are performed on a lot of data.

In normal operation processing in an SIMD microprocessor, a plurality of operation units (Processor Elements (PE)) are arranged, and the same operations are simultaneously performed on a plurality of data. In this manner, high speed operation processing can be achieved.

In "image data processing", a variety of filtering processing ways are performed in order to correct image quality. Normal filtering processing uses a weighted operation of an object pixel and pixels adjacent to horizontal scanning direction or vertical scanning direction, and therefore an SIMD type microprocessor is really suitable because of its simultaneous operation function. Although a normal weighting filter can be used for removing noise components of input image data, such kind of weighting filter has defect that contour portions are blurred.

A "median filter" is known as a useful tool for removing noises in input image data. This filter is frequently used in image processing because it can remove noise components with keeping contour portions clear.

This "median filter" performs such operation that an object pixel (or pixel at issue) and surrounding 8 pixels consisting of left pixel, right pixel, upper pixel, lower pixel, left upper pixel, right upper pixel, left lower pixel and right lower pixel) are lined in data magnitude order, and that the median pixel (placed at the center) replaces the object pixel.

Figure 5:
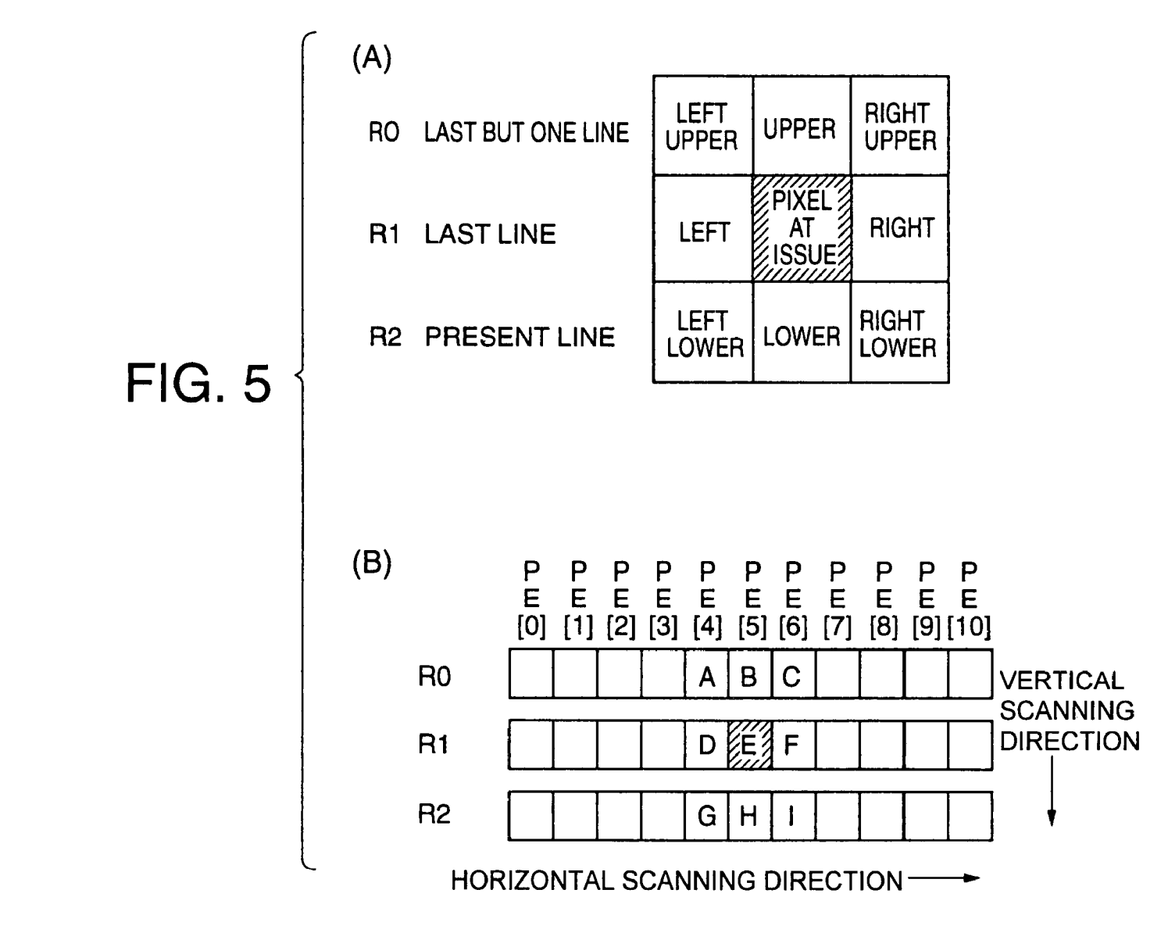
FIG. 5 shows corresponding relation between image pixels and registers.
Figure 6:
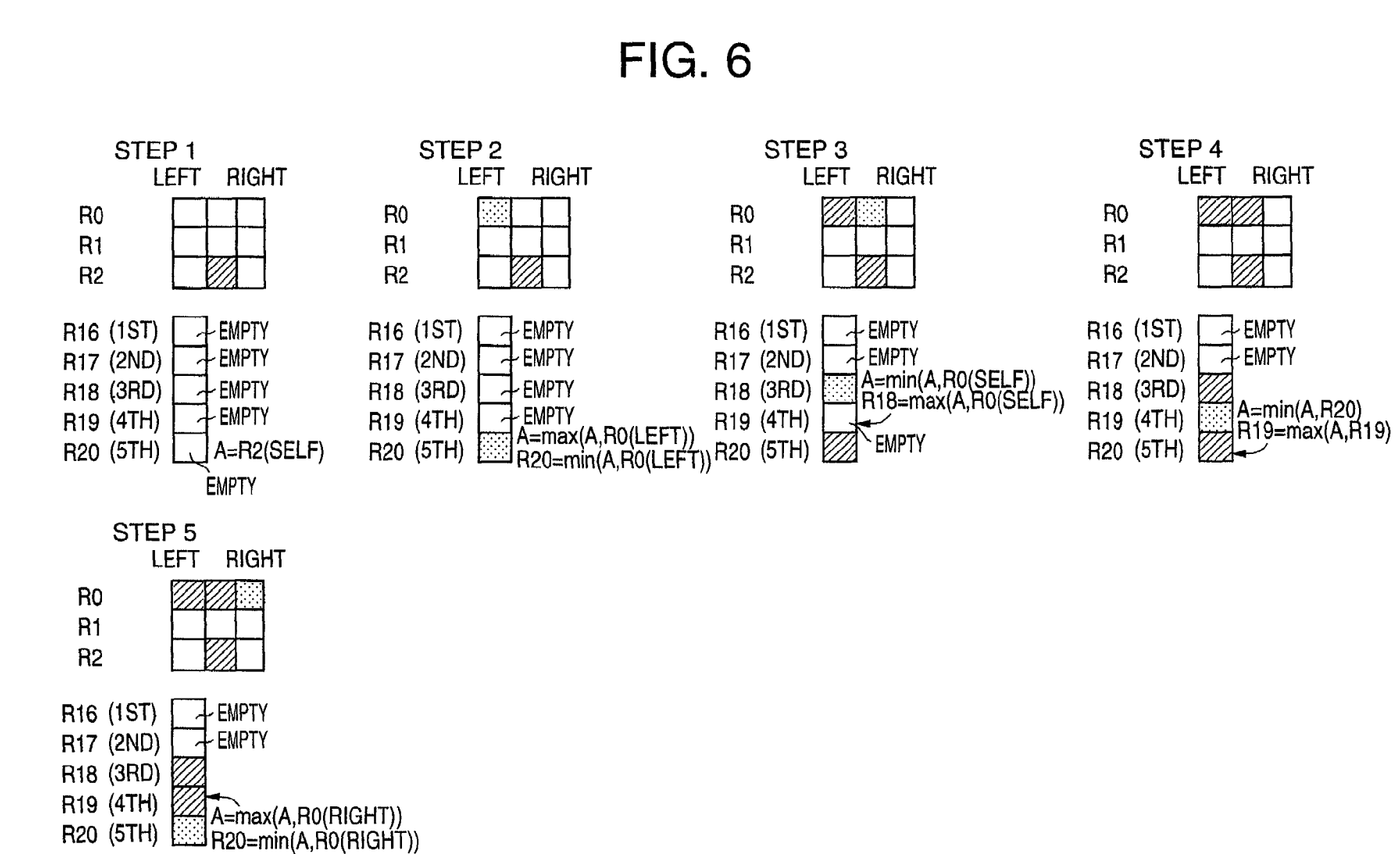
FIG. 6 shows a concept and flow (1) of median filter sort processing in "3×3" area according to the present invention.
Figure 7:
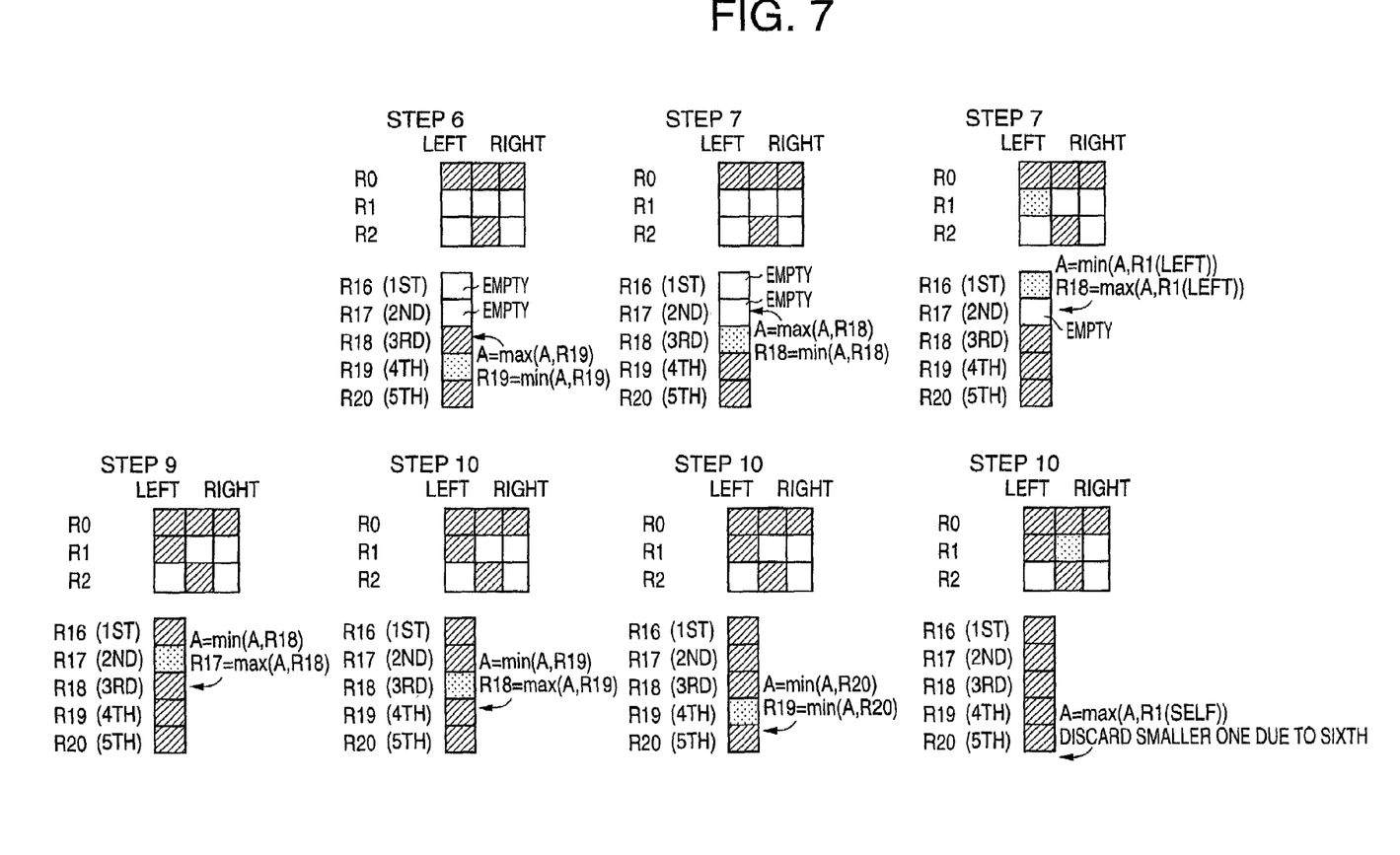
FIG. 7 shows a concept and flow (2) of median filter sort processing in "3×3" area according to the present invention.
Figure 8:
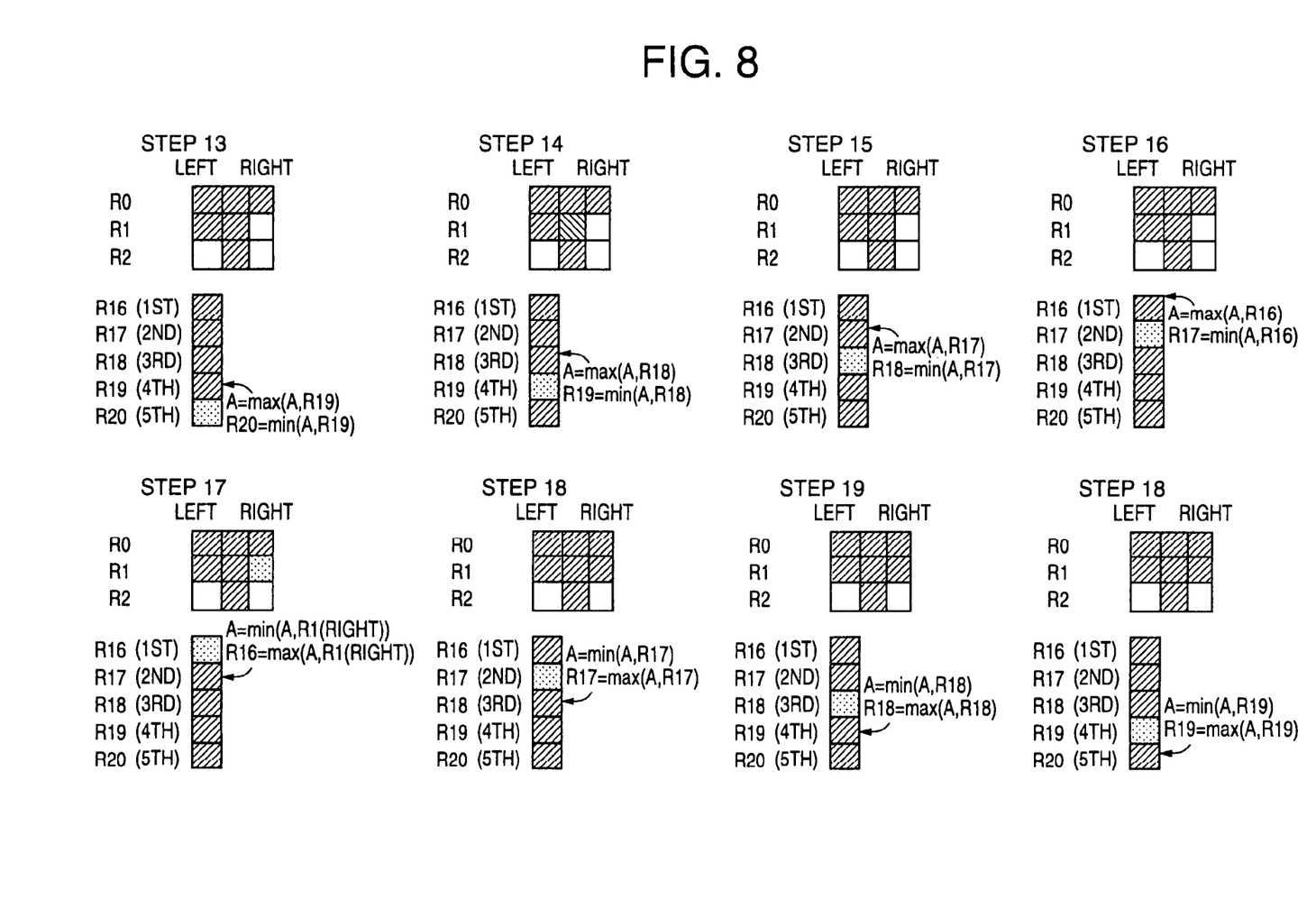
FIG. 8 shows a concept and flow (3) of median filter sort processing in "3×3" area according to the present invention.
Figure 9:
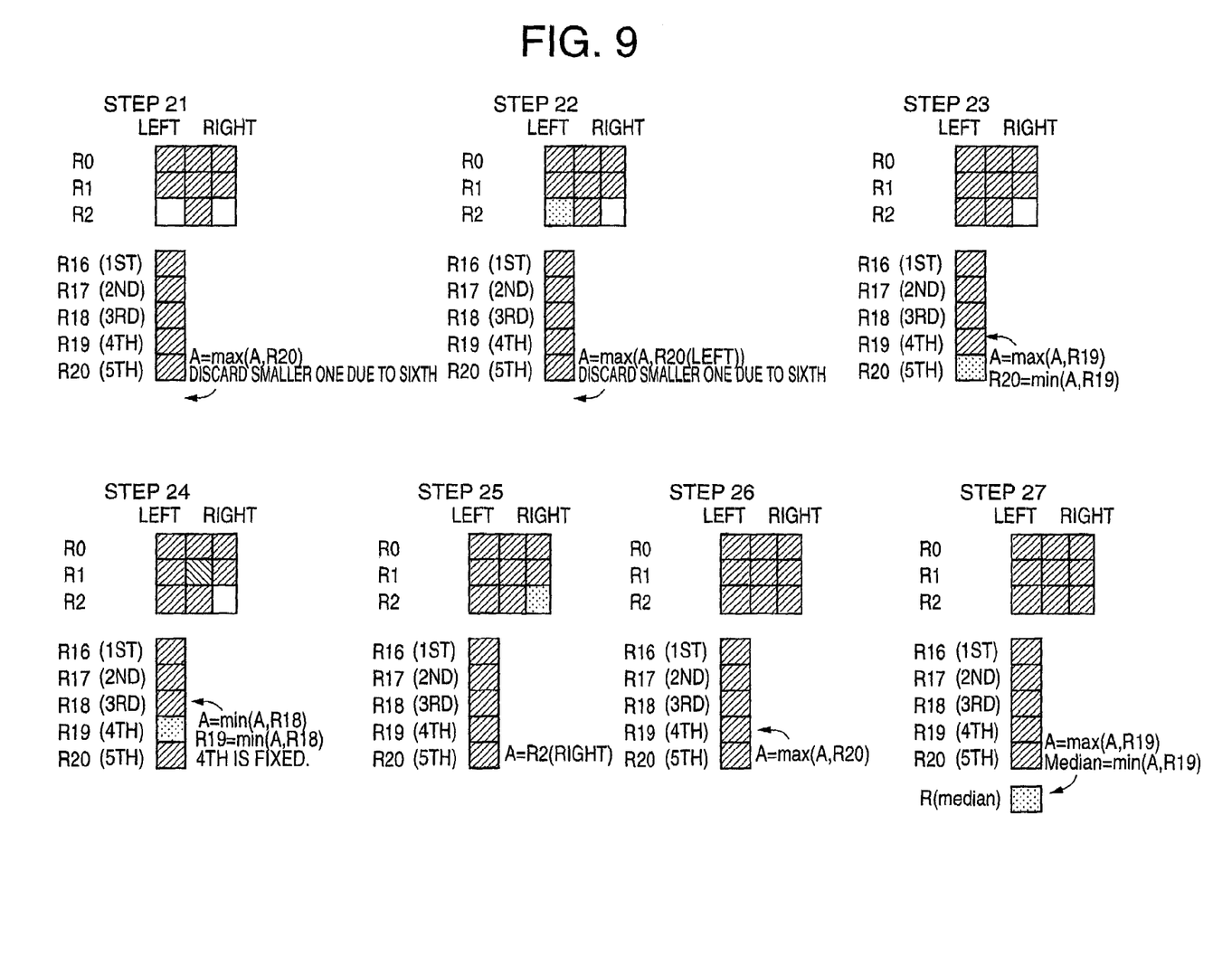
FIG. 9 shows a concept and flow (4) of median filter sort processing in "3×3" area according to the present invention.

In an SIMD type microprocessor, as shown in FIG. 5, pixel data are stored in PE registers (R2 registers in FIG. 5(B)) in horizontal scanning direction. In order to refer to or obtain pixel data in vertical scanning direction, line delay is required to be made by copying the present line pixel data to another registers (R1 registers in FIG. 5(B)) and storing the data in line buffers such as FIFO memory external to the SIMD type microprocessor. By repeating this operation several times, pixels can be referred to along a plurality of the vertical scanning directions. In FIG. 5(B), R1 registers are line-delayed to make R0 registers.

In median filter processing, it is necessary for each PE to take (or fix) the "median" relating to pixels surrounding its pixel itself. In FIG. 5(B), PE[5] is taken as an example. The object pixel datum is a pixel "E" stored in R1 register of PE[5]. Its left upper pixel datum is a pixel "A" stored in R0 register of PE[4]. Its left pixel datum is a pixel "D" stored in R1 register of PE[4]. Its left lower pixel datum is a pixel "G" stored in R2 register of PE[4]. Its right upper pixel datum is a pixel "C" stored in R0 register of PE[6]. Its right pixel datum is a pixel "F" stored in R1 register of PE[6]. Its right lower pixel datum is a pixel "I" stored in R2 register of PE[6]. The numbers affixed to PE and register numbers (R0, R1, R2) will be explained later.

The above nice pixel data "A", "B", "C", "D", "E", "F", "G", "H", "I" are sorted based on data magnitude to obtain the median (value at the center) that is the fifth largest pixel data.

Prior art needed to repeat sort processing of pixel data many times. A method of easing such bulky sort processing or speeding up the processing has been desired.

There is a method of speeding up the median filter processing, that is not relating to an SIMD microprocessor. For example, Japanese Patent Laid-open No. 6-274617 deals "3×3" pixel median filter processing, in which sort processing is separated to three stages so that three pixels is first sorted, then six pixels are merge-sorted and then nine pixels are merge-sorted finally to speed up the processing. Another method is disclosed in Japanese Patent Laid-open No. 5-2645, in which an object data are divided into bit slices and the number of data having "1" are counted from significant bit to insignificant bit to obtain data for desired order. Both methods can effectively speed up the median processing in an SISD type processor or an image processing LSI.

However, the above methods can not be applied to image processing using an SIMD type microprocessor.

The method described in Japanese Patent Laid-open No. 6-274617 can speed up the total speed of the merge-sorting of six pixels and nine pixels for an SISD type microprocessor that can perform branch processing. However, this method slows down the processing time for an SIMD type microprocessor because that the branch processing can not be performed on PE by PE basis and all branched operations have to be done.

The method disclosed in Japanese Patent Laid-open No. 5-2645, divides an object data into bit slices and counts the number of data having "1" from significant bit to insignificant bit to obtain data for desired order. If this method is applied to an SIMD type microprocessor, because both pixel data on both sides of an object pixel are stored in adjacent PE registers, data should be extracted from adjacent PE registers in order to make data divided into bit slices, increasing the number of wiring. Further, if counters and adders for bit slices are provided for all bits of each PE, circuit size will be unrealistically increased. If processing is divided to perform for each bit, the cycle time will be drastically increased.

Japanese Patent Laid-open No. 11-149554discloses a median filter processing in an SIMD type microprocessor, in which "3×3 pixels" are calculated. First, three pixels are sorted in the "column" direction. Then the sorted three pixel data are sorted in the "row" direction. Lastly, sort is performed in the diagonal direction.

This method does not disclose the basic "three pixel sort processing", and therefore the basic "three pixel sort processing" can not be performed with satisfactorily high speed. If the "three pixel sort processing" consumes long time, the total processing time is proportionally increased. Prior art SIMD type microprocessors perform the following method in order to sort the three pixels.

In the following method, three pixel data to be compared are stored in R0, R1 and R2 registers of each PE. Sorted data are stored in R16, R17 and R18 registers in descendent order. "MAX" instruction means an instruction to compare two source register contents and write back the bigger data into a designated register. "MIN" instruction means an instruction to compare two source register contents and write back the smaller data into a designated register.

1. Perform MAX operation on R0 and R1 and store the result in R16;
2. Perform MIN operation on R0 and R1 and store the result in R17;
3. Perform MIN operation on R2 and R17 and store the result in R18;
4. Perform MAX operation on R2 and R17 and store the result in R17;

5. Perform MAX operation on R16 and R17 and store the result in R16; and

6. Perform MIN operation on R16 and R17 and store the result in R17.

The above explained six cycles are needed.

In order to do "3×3 pixels" median filtering processing according to the method disclosed in Japanese Patent Laid-open No. 11-149554, the following cycles are needed.

(1) Sort the 3×3 pixel data in the "column" direction (three columns can be carried out simultaneously due to "SIMD"); six cycles (2) Sort the 3×3 pixel data in the "row" direction; 10 cycles for three lines (3) Sort the 3×3 pixel data in the diagonal direction; six cycle 22 cycles are needed in total. In (2) above, when obtaining the three 3×3 pixel's MIN and MAX, sorting is not necessary and 2 cycles are enough, which is shorter than 18 cycles required for sorting three lines.

SUMMARY OF THE INVENTION

It is an object of the present invention to provide a method of data sorting processing with high speed on each processor element of an SIMD microprocessor.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an SIMD type microprocessor having a plurality of processor elements, wherein data stored in a specific register included in each processor element and data stored in an operand-designated source register are compared based on a first type of instruction; after the comparison, a larger data is stored in the specific register; and a smaller data is stored in the source register or an operand-designated destination register other than the source register.

DESCRIPTION OF THE PREFERRED EMBODIMENTS

In the following, embodiments of the present invention will be described with reference to the accompanying drawings.

Further, the present invention is not limited to these embodiments, but various variations and modifications may be made without departing from the scope of the present invention.

Figure 1:
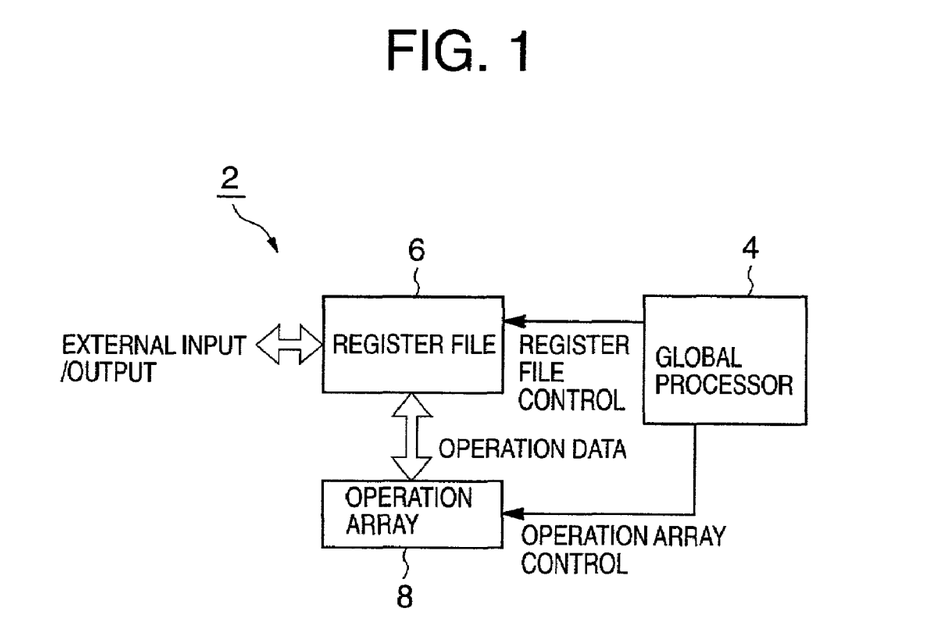
FIG. 1 shows a block diagram of an SIMD type microprocessor according to the present invention.

FIG. 1 shows a block diagram of an SIMD type microprocessor according to an embodiment of the present invention. The SIMD type microprocessor 2 includes a global processor 4, a register file 6 and an operation array 8.

(1) Global Processor 4

This global processor 4 is a so-called an SISD type processor, and includes a program RAM 10 and a data RAM 12 (see FIG. 2), and-interprets program and generates many control signals. These control signal are supplied to the register file 6 and the operation array 8 as well as to each built-in block. When the GP (Global Processor) executes instructions, it uses built-in general purpose registers, ALU (Arithmetic Logic Unit) and the like to perform many operations and do program controls.

(2) Register File 6

The register file 6 keeps data to be processed by PE (processor Element) instructions. A PE (processor element) 3 is, as well known, a unit by which an SIMD (Single Instruction-Stream, Multiple Data-Stream) type processor performs individual operation. As shown by the register file 6 and the operation array 8 in FIG. 2, an SIMD type microprocessor 2 shown in FIG. 2 includes 256 PEs 3. The above mentioned PE instructions are SIMD type instructions and executes the same operation simultaneously on a plurality of data stored in the register file 6. Reading from and writing into the register file 6 are controlled by the global processor 4. Data read out is supplied to and processed by the operation array 8, then written into the register file 6.

The register file 6 can be accessed from outside of the processor 2. Specified registers can be read out/written into from outside independently of the control by the global processor 4.

(3) Operation Array

Operations based on PE instructions are executed. The operations are all controlled by the global processor 4.

Figure 2:
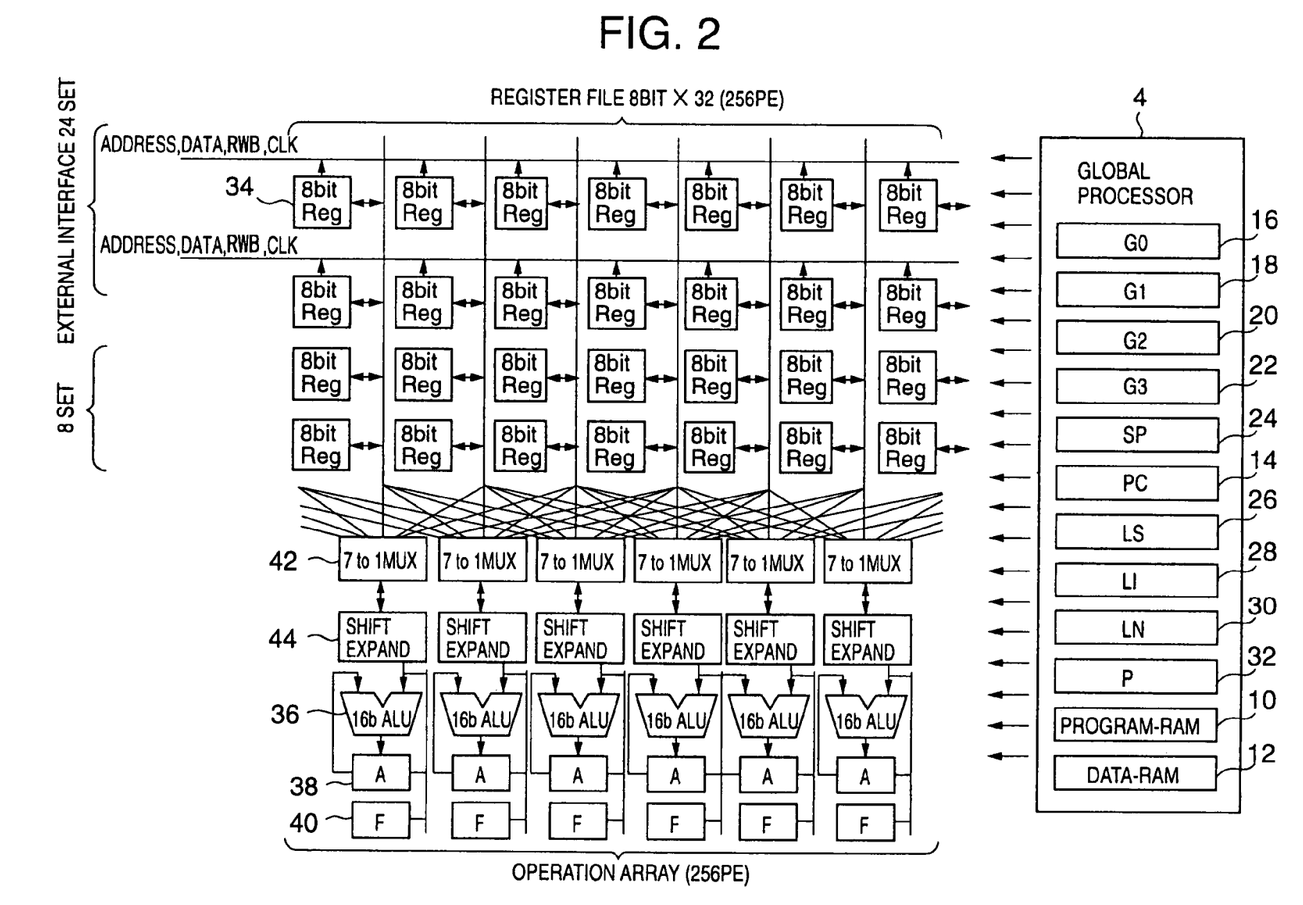
FIG. 2 shows in more detail a block diagram of an SIMD type microprocessor according to the present invention.

FIG. 2 shows the structure of the SIMD processor according to present invention in more detail.

A global processor 4 has a program RAM 10 for storing program for the processor 2, and a data RAM 12 for storing operation data. Further included are a program counter (PC) 14 for storing the address of the program, general purpose registers G0, G1, G2 and G3 (16, 18, 20, 22), a stack pointer (SP) 24 for storing the address of data RAM saving register contents, a link register (LS) 26 storing the address of place which called a subroutine, an LI register 28 and LN register 30 for storing branching addresses when requesting IRQ (Interrupt ReQuest) and NMI (Non-Maskable Interrupt request), and a processor status register (P) 32 for storing the status of the processor.

These registers and an instruction decoder, ALU, SCU (sequential unit), a memory control circuit, an interrupt control circuit, an external I/O control circuit and a GP operation control circuit (not shown) are used for executing the GP instructions.

When executing the PE instructions, an instruction decoder (not shown), a register file control circuit (not shown), PE operation control circuit (not shown) are used for controlling the register file 6 and operation array 8. Data can be transferred from the data RAM 12 to a plurality of PE register files 6.

In the register files 6, 32 8-bit registers are built in each PE unit. 32 registers for each of 256 PEs are arrayed. The registers 34 are called R0, R1, R2, . . . R31 for each PE. Each register 34 has one reading port and one writing port for the operation array 8, and is accessed by the operation array 8 with using an 8-bit read/write bus. 24 registers (R0-R23) out of 32 registers can be accessed from outside of processor, and any register can be read/written from outside by inputting clock (CLK), address (Address) and read/write control (CWB). The remaining 8 registers (R24-R31) are used for temporarily storing operation data when performing PE operations.

The operation array 8 includes a 16-bit ALU 36, a 16-bit A register 38, one or plural F register 40. The operations instructed by PE instruction are normally performed so that data read out from the register file 6 or given by the global processor 4 is inputted to one port of the ALU 36 and the contents of the A register 38 is inputted to the other port of the ALU 36. The result of the operation is stored in the A register 38. Therefore, operation is normally performed on data obtained from R0-R31 registers 34 or the global processor 4 and data stored in the A register 38.

7 to 1 multiplexers 42 are provided between the register file 6 and the operation array 8. As shown in FIG. 2, one multiplexer 42 can perform operation on data stored in R0-R31 registers 34 included in PE3 to which the multiplexer belongs, data stored in R0-R31 registers 34 included in left side three PE3, and data stored in R0-R31 registers 34 included in right side three PE3. 8-bit data in the register file 6 is shifted to the left by any bits by a shifting/extending circuit 44, and inputted to the ALU3.

An 8-bit condition register is included (not shown) for indicating valid/invalid for each PE3, and any specific PE3 can be selected as an operation object.

Each PE3 is assigned a number called "PE number". In the SIMD type microprocessor shown in FIG. 2, because there exist 256 PEs, 8-bit bit sequence (256 kinds of 00000000b-11111111b, b means binary) is assigned as PE number to each PE3. The PE numbers are assigned from the leftmost to the right, but any numbering way is possible. PE[n] represents PE having PE number "n". Therefore, the SIMD microprocessor in FIG. 2 has PE[0], PE[1], PE[2], PE[3], . . . PE[254], PE[255].

The above explained PE number data is created by changing the combination that an 8-bit input terminal of each PE3 is coupled to VCC or GND.

First Embodiment

Figure 3:
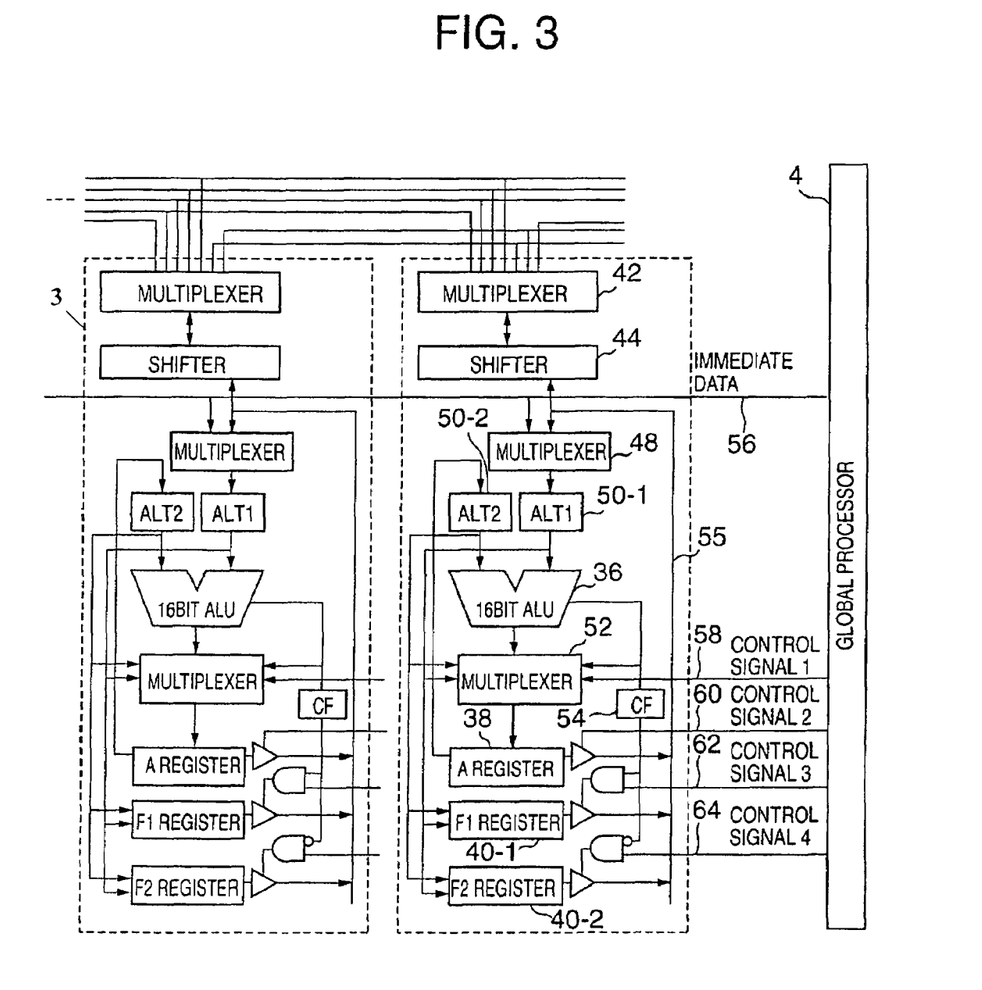
FIG. 3 shows a block diagram of an SIMD type microprocessor according to the first embodiment of the present invention, illustrating an enlarged block diagram of one processor element portion.

FIG. 3 shows a block diagram of an SIMD microprocessor according to the first embodiment of the present invention, especially shows enlarged one PE3 portion.

An operation array 8 of each PE includes:
an ALU 36;
two ALU latches (ALT[1] 50-1, ALT[2] 502);
an A register 38 for storing operation result;
two F registers utilized as temporary registers (F1 register 40-1, F2 register 40-2); and
a CF (carry flag) 54 for latching a carry output from the ALU 36.

A multiplexer 52 inserted between the A register 38 and the ALU 36, selects one data out of three data that are ALU 36 operation result, the contents of two ALU latches (ALT[1] 50-1, ALT[2] 50-2), and stores the selected data to the A register 38. Control signals for controlling selection by the multiplexer 52 are:
a control signal [1] from the global processor 4; and
the carry output from the ALU 36.

In the ALU 36, when executing normal operation instructions, the operation result of the ALU 36 are inputted to the A register 38. When executing "MAXS" instruction or "MINS" instruction (explained later), it is preferable that the above mentioned control signal controls so that the carry selects either of ALT[1] or ALT[2] to input it to the A register 38.

F1 register 40-1 and F2 register 40-2 can transfer data from either ALT[1] or ALT[2], that is determined by a control signal from the global processor 4. The A register 38 and two F registers (F1 register 40-1 and F2 register 40-2) have lines for outputting data onto a data bus 55. The output from the A register 38 is controlled by a control signal 2 from the global processor 4. The output from the two F registers (F1 register 40-1 and F2 register 40-2) are controlled by control signals 3, 4 and a value of the CF 54.

The operation of the above described SIMD microprocessor according to the first embodiment of the present invention will be explained below.

First, explanation will be given for the case of executing "MAXS" instruction.

The contents of the A register 38 is initially inputted to ALT[2] 50-2. An operand-designated value of the source register is inputted to ALT[1] 50-1, and compared (subtracted) by the ALU 36. The comparison result is outputted as a "carry" from the ALU 36. After the comparison, a larger one (that is, MAXS instruction) of ALT[1] 50-1 and ALT[2] 50-2 is inputted to the A register 38 depending on the value of the "carry".

The global processor controls so that the value of ALT [1] 50-1 is inputted to F1 register 401 and the value of ALT [2] 50-2 is inputted to F2 register 40-2.

Regarding data transfer to a destination register, the value of CF 54 latching the carry determines which of F1 register 40-1 and F2 register 40-2 should output data to the data bus 55. Therefore, a smaller value (at MAXS instruction) can be transferred.

It was assumed in the above embodiment that the source register and the destination register are separately operand-designated. The source register and the destination register can be designated by the same operand (source operand only). In this case, because of fewer operands it is advantageous with regard to instruction mapping.

Second, explanation will be given for the case of executing "MINS" instruction. The MINS instruction can be realized by reversing the comparison (subtraction) order in the ALU 36, opposite from the case of the MAXS instruction. Alternatively, the MINS instruction can be realized in another way where the inverted "carry" is inputted to the multiplexer 52 selecting input to the A register 38, the value of the ALT [2] 50-2 is inputted to the F1 register 40-1, and the value of the ALT [1] 50-1 is inputted to the F2 register 40-1. In this manner, the smaller data is stored in the A register 38 and the larger data is stored in the destination register, to the contrary to MAXS instruction execution.

Second Embodiment

In case where two data to be compared are unsigned data, it is possible to judge the comparison result from the carry output. On the contrary, in case where the data to be compared are signed data, the comparison result should be judged from the EXCLUSIVE-OR of a negative bit (MSB of the subtraction result of the ALU 36) and an overflow bit.

Figure 4:
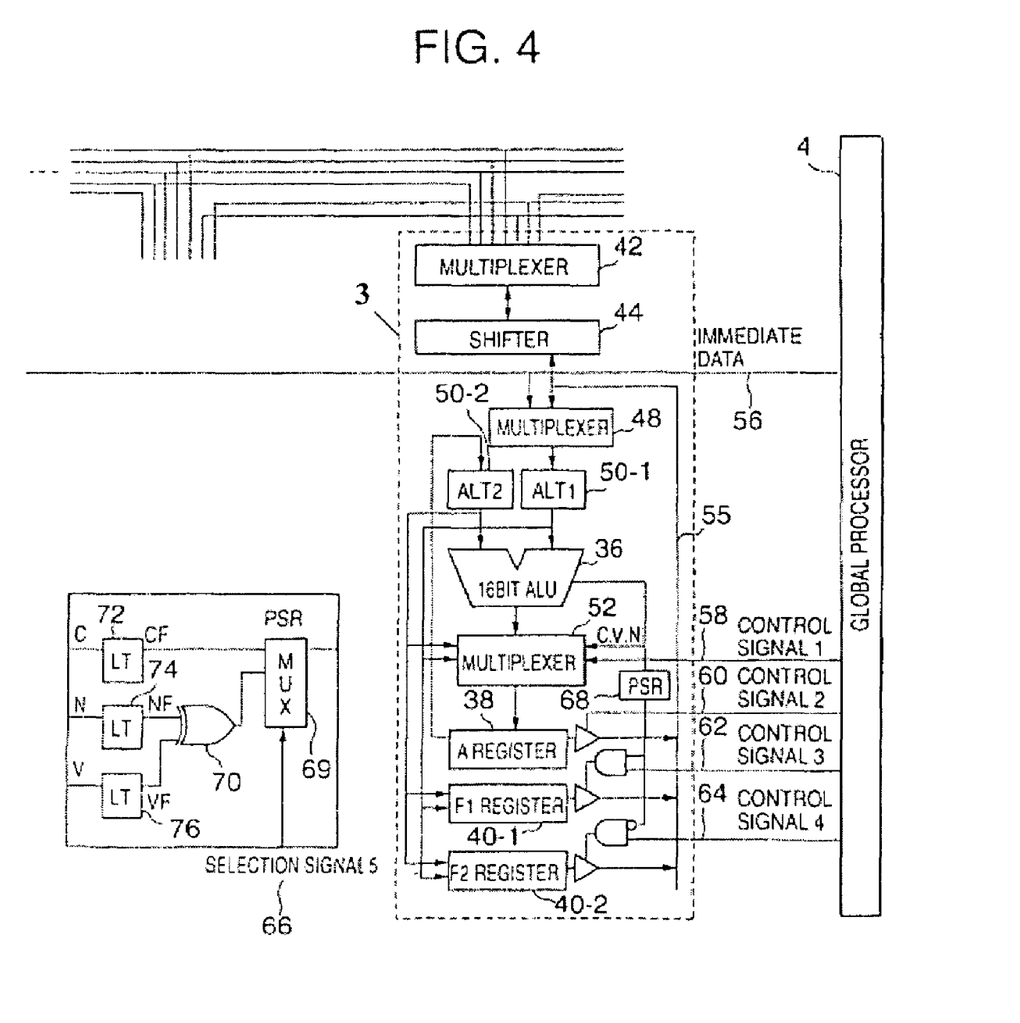
FIG. 4 shows a block diagram of an SIMD type microprocessor according to the second embodiment of the present invention, illustrating an enlarged block diagram of one processor element portion.

FIG. 4 shows a block diagram of an SIMD type microprocessor 2 according to the second embodiment of the present invention, specifically shows an enlarged block diagram of one PE3 portion.

According to the structure shown in FIG. 4, both unsigned data and signed data can be processed. Each flag (C:carry, V:overflow, N:negative) outputted from the ALU 36 is inputted to a multiplexer 52 which selects the input to an A register 38, and to a flag register block (PSR) 68. In case where the comparison data are unsigned data, the multiplexer 52 selects data to be inputted to the A register 38, depending on the carry. In case where the comparison data are signed data, the multiplexer 52 selects data to be inputted to the A register, depending on the EXCLUSIVE-OR of the overflow bit and negative bit. The flag register block (PSR) 68 latches each flag. In case where the comparison data are unsigned data, a multiplexer 69 included in the PSR 68 outputs the carry flag as an output enable control signal for F1 register 40-1 and F2 register 40-2. In case where the comparison data are signed data, the multiplexer 69 included in the PSR 68 outputs the EXCLUSIVE-OR of the overflow bit and negative bit as an output enable control signal for F1 register 40-1 and F2 register 40-2.

Basic Sort Processing

The SIMD type microprocessor 2 shown in FIG. 3 or 4 can effectively perform sort processing on already sorted data when new data are added.

Sort processing will be explained below in case where already sorted five data have been stored in each register of R0, R1, R2, R3, R4 (R0>=R1>=R2>=R3>=R4), and one unsorted data is added.

1. load the unsorted data in the A register 38;
2. compare the A register 38 and R4 data, store the larger data in the A register 38;
3. compare the A register 38 and R3 data, store the larger data in the A register 38 and store the smaller data in the R4 register;
4. compare the A register 38 and R2 data, store the larger data in the A register 38 and store the smaller data in the R3 register;
5. compare the A register 38 and R1 data, store the larger data in the A register 38 and store the smaller data in the R2 register;
6. compare the A register 38 and R0 data, store the larger data in the A register 38 and store the smaller data in the R1 register; and
7. store the contents of the A register 38 into the R0 register.

Because the A register keeps the data to be transferred to the significant side of the sort buffers (R0, R1, R2, R2, R3, R4), the above processing can be continued. The above processing is performed in the ascendant order, but can be performed in the descendant order.

Sort Processing for Three Data

Sort processing for three data using the SIMD microprocessor 2 according to the first or second embodiment will be explained below.

Data to be compared are stored in each register of R0, R1, R2 of each PE3. Sorted data will be stored in each register R16, R17, R18 of each PE3 (R16>=R17>=R18).

1. load the contents of the R0 register into the A register 38;
2. compare the A register 38 and R1 data, store the larger data in the A register 38 and store the smaller data in the R18 register;
3. compare the A register 38 and R2 data, store the smaller data in the A register 38 and store the larger data in the R16 register;
4. compare the A register 38 and R18 data, store the smaller data in the A register 38 and store the larger data in the R17 register; and
5. store the contents of the A register 38 into the R18 register.

The following processing can perform the same sort processing as above.

1. load the contents of the R0 register into the A register 38;
2. compare the A register 38 and R1 data, store the smaller data in the A register 38 and store the larger data in the R16 register;
3. compare the A register 38 and R2 data, store the larger data in the A register 38 and store the smaller data in the R18 register;
4. compare the A register 38 and R16 data, store the larger data in the A register 38 and store the smaller data in the R17 register; and
5. store the contents of the A register 38 into the R16 register.

Although prior art SIMD type processors needed six cycles, five cycles are enough in the present embodiment. In the above steps, the step of "1. load the contents of the R0 register into the A register 38" must have been performed before image processing. Therefore, one cycle can be further deleted by regarding the image data stored in the A register 38 as the initial object to be sorted.

Median Filter Processing

Median filter processing in "3×3" pixel region according to the present invention will be explained below.

In this case, the median (the central value) is the fifth data, and therefore five buffers are necessary as sorting buffers. Each register of R16, R17, R18, R19, R20 is used as the five buffers here. It is assumed that the uppermost line pixel data is stored in R0 registers in each PE3. The central line pixel data is stored in R1 registers. The lowermost line pixel data is stored in R2 registers. In the SIMD microprocessor 2, PE3 are arrayed in the horizontal scanning direction. The lowest line pixel data (data in R2 registers) to the vertical scanning direction are the present line data. Data in R0 registers and R1 registers are delayed.

1. load the data stored in the R2 register in the A register 38 (the present line data is usually already stored);
2. compare the A register 38 and the data stored in R0 register in the next left PE and store the larger data in the A register 38 and store the smaller data in R20 register;
3. compare the A register 38 and the data stored in R0 register in the same PE and store the smaller data in the A register 38 and store the larger data in R18 register;
4. compare the A register 38 and R20 data, store the smaller data in the A register 38 and store the larger data in the R19 register;
5. compare the A register 38 and the data stored in R0 register in the next right PE and store the larger data in the A register 38 and store the smaller data in the R20 register;
6. compare the A register 38 and R19 data, store the larger data in the A register 38 and store the smaller data in the R19 register;
7. compare the A register 38 and R18 data, store the larger data in the A register 38 and store the smaller data in the R18 register;
8. compare the A register 38 and the data stored in R1 register in the next left PE, store the smaller data in the A register 38 and store the larger data in the R16 register;

9. compare the A register 38 and R18 data, store the smaller data in the A register 38 and store the larger data in the R17 register;

10. compare the A register 38 and R19 data, store the smaller data in the A register 38 and store the larger data in the R18 register;

11. compare the A register 38 and R20 data, store the smaller data in the A register 38 and store the larger data in the R19 register;

12. compare the A register 38 and the data stored in the R1 register in the same PE, store the larger data in the A register 38;

13. compare the A register 38 and the data stored in the R19 register, store the larger data in the A register 38 and store the smaller data in the R20 register;

14. compare the A register 38 and the data stored in the R18 register, store the larger data in the A register 38 and store the smaller data in the R19 register;

15. compare the A register 38 and the data stored in the R17 register, store the larger data in the A register 38 and store the smaller data in the R18 register;

16. compare the A register 38 and the data stored in the R16 register, store the larger data in the A register 38 and store the smaller data in the R17 register;

17. compare the A register 38 and the data stored in the R1 register in the next right PE, store the smaller data in the A register 38 and store the larger data in the R16 register;

18. compare the A register 38 and the data stored in the R17 register, store the smaller data in the A register 38 and store the larger data in the R17 register;

19. compare the A register 38 and the data stored in the R18 register, store the smaller data in the A register 38 and store the larger data in the R18 register;

20. compare the A register 38 and the data stored in the R19 register, store the smaller data in the A register 38 and store the larger data in the R19 register;

21. compare the A register 38 and the data stored in the R20 register and store the larger data in the A register 38;

22. compare the A register 38 and the data stored in the R2 register in the next left PE, store the larger data in the A register 38;

23. compare the A register 38 and the data stored in the R19 register, store the larger data in the A register 38 and store the smaller data in the R20 register;

24. compare the A register 38 and the data stored in the R18 register, store the larger data in the A register 38 and store the smaller data in the R19 register;

Here, the fourth data is fixed except the remaining one pixel, and therefore further sorting is not needed.

25. load the data stored in the R2 register in the next right PE into the A register 38;

26. compare the A register 38 and the data stored in the R20 register and store the larger data in the A register 38;

27. compare the A register 38 and the data stored in the R19 register and store the smaller data in a desired register;

FIGS. 6, 7, 8 and 9 show the concept and flow of the above explained sort processing. In the figures, "Empty" means that a sort buffer is vacant, shadowed portions are source-designated (3×3 pixels) or destination-designated (R16-R20 buffers). In hatched portions, data have been already compared (3×3 pixels), or data have been already stored (R16-R20 sort buffers).

The above explained processing has 27 cycles including "1." cycle, and 26 cycles except "1.". Therefore the number of cycles is a little bit larger than the invention described in Japanese Patent Laid-open No. 11-149554. However in the invention described in Japanese Patent Laid-open No. 11-149554, the number of data is limited (for example 3×3), because the number of data to be sorted should be products of natural numbers. On the contrary, the present invention can perform sort processing without depending on the number of data to be sorted.

According to the first or second embodiment of the present invention, two data can be compared with each other and the larger data (or smaller data) can be stored in a specific register, and the smaller data (or the larger data) can be stored in an operand-designated register. Therefore, without providing an SIMD type microprocessor with any sorting hardware, the time required for merging unsorted data with sorted data is significantly shortened.

Processing flow can be realized, which can shorten the processing time for sorting unsorted data.

Figure 10:
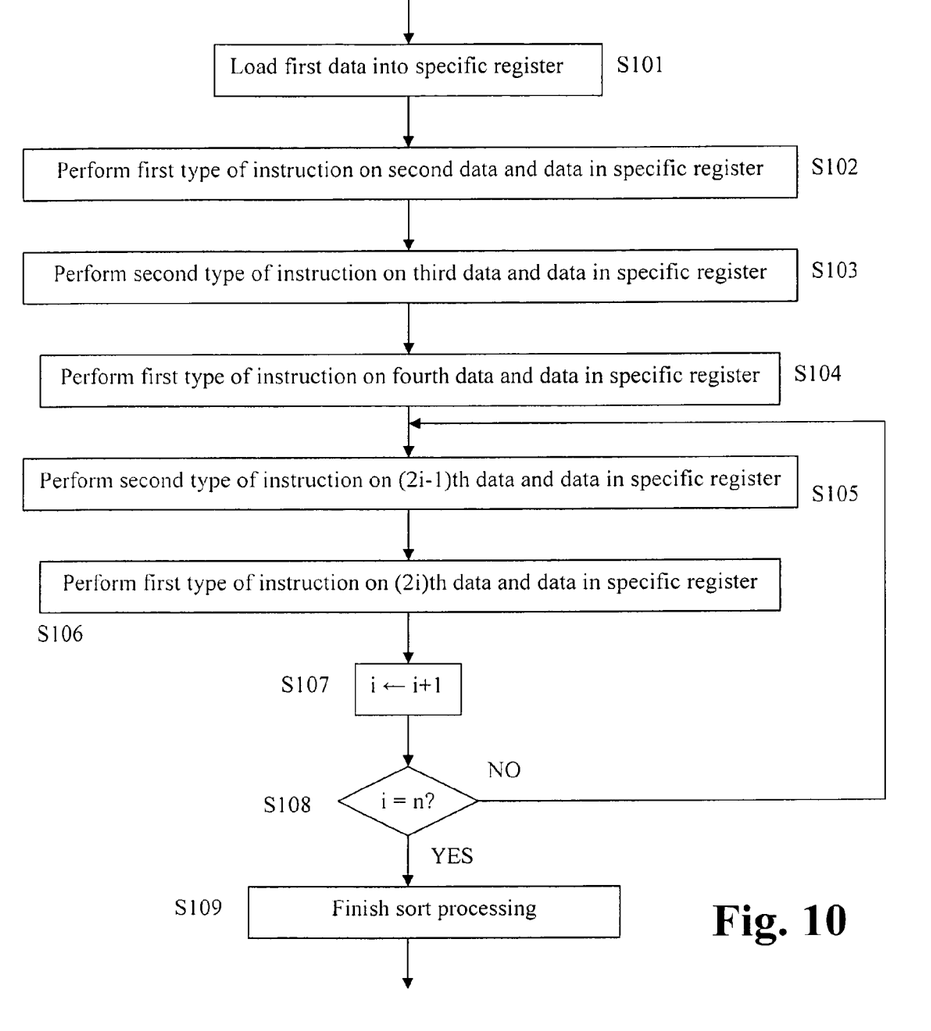
FIG. 10 shows an example of a flow of a method for sort processing n data in each processor element using the SIMD type microprocessor.
Figure 11:
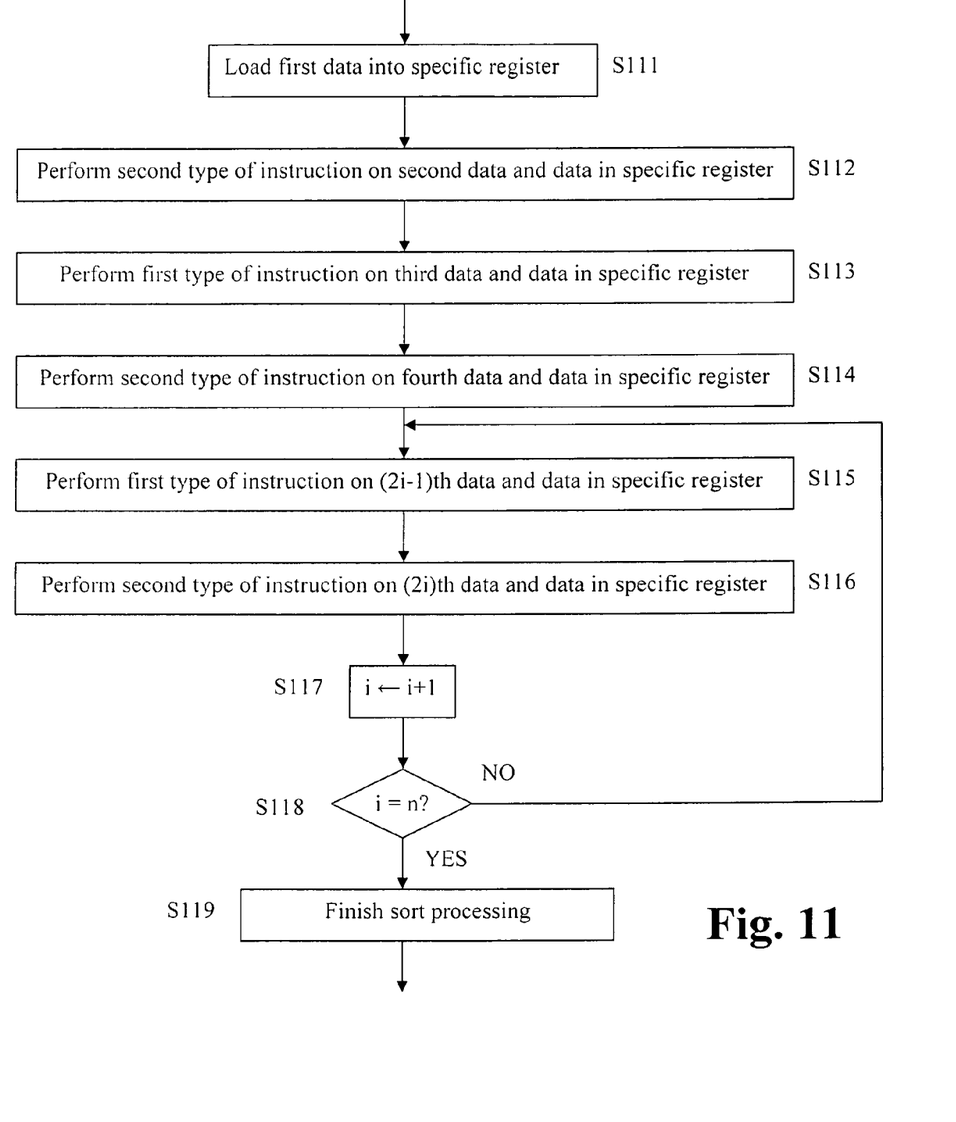
FIG. 11 shows another example of a flow of a method for sort processing n data in each processor element using the SIMD type microprocessor.

A method for sort processing n data in each processor element using the SIMD type microprocessor, in one example, is shown in FIG. 10, wherein n (n is a natural number larger than 3) general purpose registers provided at each processor element are used as sort buffers in each processor element, and n data are stored in each of the general purpose registers from a first register to nth register in order from large data to small data in FIG. 10. The method comprises the steps of:

(1) loading a first data to be compared into a specific register (step S101);

(2) performing a first type of instruction on a second data to be compared and the specific register data, storing a smaller data in an nth register and storing a larger data in the specific register (step S102);

(3) performing second type of instruction on a third data to be compared and the specific register data, storing a larger data in an (n−2)th register and storing a smaller data in the specific register, and performing the second type of instruction on the nth register data and the specific register data, storing a larger data in an (n−1)th register and storing a smaller data in the specific register (step S103);

(4) performing the first type instruction on a fourth data to be compared and the specific register data, storing a smaller data in the nth register and storing a larger data in the specific register, and performing the first type of instruction on the (n−1)th register data and the specific register data, storing a smaller data in the (n−1)th register and storing a larger data in the specific register, and further performing the first type of instruction on the (n−2)th register data and the specific register data, storing a smaller data in the (n2)th register and storing a larger data in the specific register (step S104);

(5) performing the second type of instruction on a (2i−1)th data to be compared (i is a natural number larger than 2) and the specific register data, storing a larger data in an (n−(2i−2))th register and storing a smaller data in the specific register, and performing the second type of instruction on a (n−(2i−4))th data to be compared and the specific register data storm a larger data in to a (n−(2i−3))th register and storing a smaller data in the specific register, then shifting ordinal one by one by sort buffers from the first to the nth general purpose registers, performing the second type instruction on data stored in the sort buffers of the general purpose registers and the specific register data, repeatedly storing a larger data in a previous register and performs the second type of instruction on data stored in the nth general purpose register and the specific register data, storing a large data in the (n−1)th general purpose register and storing a smaller data in the specific register (step S105);

(6) performing the first type of instruction on a 2ith data to be compared and the specific register data, storing a smaller data in the nth general purpose register and storing a larger data in the specific register, further performing the first type of instruction on the (n−1)th general purpose register and the specific register, storing a smaller data in the (n−1)th general purpose register and storing a smaller data in the (n−1)th general purpose and storing a larger ordinal in the specific register; further then shifting data one by one by sort buffers from the nth to the first general purpose registers, performing the first type of instruction on data stored in the sort buffers of the general purpose registers and the specific register data, repeatedly storing a smaller data in the same general purpose register and performs the first type of instruction on data stored in the (n−(2i−2)th general purpose register and the specific register, storing a smaller data in the (n−(2i−2)th general purpose register and storing the larger data in the specific register (step S106);

(7) repeating steps (5) and (6) (step S108, "NO"), while increasing i one by one (step S107) until the data to be compared become the nth one (step 108, "YES"); and (8) finishing she sort processing at the maximum end of the sort buffers when n is an even number, or finishing the sort processing at the minimum end of the sort buffers when n is an odd number (step S109), A method for sort processing n data in each processor element using the SEMI) type microprocessor, in one example,, is shown in FIG. 11, wherein n (n >=4)general purpose registers provided at each processor element are used as sort buffers in each processor element, n data are stored in each of the general purpose registers from a first register to nth register in order from large data to small data. The method comprises the steps of:

(1) loading a first data to be compared into a specific register (step S111);

(2) performing a second type of instruction on a second data to be compared and the specific register data, storing a larger data in a first register and storing a smaller data in the specific register (step S112);

(3) performing a first type of instruction on a third data to be compared and the specific resister data, storing a smaller data in a third register and storing a larger data in the specific register, and performing the first type of instruction on the first register data and the specific register data, storing a smaller data in a second register and storing a larger data in the specific register (step S113);

(4) performing the second type of instruction on a fourth data to be compared and the specific register data, storing a larger data in the first register and storing a smaller data in the specific register, and performing the second type of instruction on the second register data and the specific register data, storing a larger data in the second register and storing a smaller data in the specific register, and further performing the second type of instruction on the third register data and the specific register data storing a larger data in the third register and storing a smaller data in the specific register (step S114);

(5) performing the first type of instruction on a (2i−1)th data to be compared (i is a natural number larger than 2) and the specific register data, storing a smaller data in an (2i−1)th register and storing a larger data in the specific register, and performing the first type of instruction on a(2i−3)th data to be compared and the specific register data, storing a smaller data in a (2i−2) register and storing a larger data in the specific register, then shifting data one by one by sort buffers from the nth to the first general purpose registers, performing the first type of instruction on data stored in the sort buffers of the general purpose registers and the specific register data, repeatedly storing a smaller data in a previous register and performs the first type of instruction on data stored in the first general purpose register and the specific register, storing a smaller data in the second register and storing a larger data in the specific register (step S115);

(6) performing the second type of instruction on a 2ith data to be compared and the specific resister data, storing a larger data in the first general purpose resister and storing a smaller data in the specific register, further performing the second type of instruction on the second general purpose register and the specific register, storing a larger data in the second general purpose register and storing a smaller data in the specific register, further then shifting ordinal one by one by sort buffers from the first to nth general purpose registers, performing the second type of instruction on data stored in the sort buffers of the general purpose registers and the specific register data, repeatedly storing a larger data in the same general purpose register and performs the second type of instruction on data stored in the (2i−1)th general purpose register and the specific register data, storing a larger data in the (2i−1)th general purpose register and storing the smaller data in the specific register (step S116);

(7) repeating steps (5) and (6) (step S118, "NO")while increasing i one by one (step S117) until the data to be compared become the nth one (step S118, "YES"); and (8) finishing the sort processing at the minimum end of the sort buffers when n is an even number, or finishing the sort processing at the maximum end of the sort buffers when n is an odd number (step S119).

What is claimed is:

1. A SIMD type microprocessor having a plurality of processor elements, wherein in each of said plurality of processor elements, first data stored in a specific register of the processor element and second data stored in an operand-designated source register of the processor element are compared based on a first instruction of a first type, instructions of said first type generally causing a larger data to be stored in a specific register and causing a smaller data to be stored in a source register, and said first instruction of the first type causes a larger one of said first and second data to be stored in the specific register, and causes a smaller one of said first and second data to be stored in the source register or an operand-designated destination register other than the source register, wherein said first instruction of the first type is applied in each of said plurality of processing elements.

2. The SIMD type microprocessor of claim 1 further comprising a register file of a plurality of registers, wherein said operand designated source register is one of said plurality of registers of said register file.

3. The SIMD type microprocessor of claim 1, wherein each processing element has a corresponding operand designated source register for storing said second data for said comparison based on instructions of said first type.

4. The SIMD type microprocessor of claim 1, wherein each of said plurality of processing elements has a similar constitution.

5. The SIMD type microprocessor of claim 1, wherein said each of the plurality of processor elements includes a plurality of general purpose registers configured to be used as sort buffers.

6. An SIMD type microprocessor having a plurality of processor elements, wherein in each of said plurality of processor elements, first data stored in a specific register of the processor element and second data stored in an operand-designated source register of the processor element are compared based on a second instruction of a second type, instructions of said second type generally causing a smaller data to be stored in a specific register and causing a larger data to be stored in a source register, and said second instruction of the second type causes a smaller one of said first and second data to be stored in the specific register, and causes a larger one of said first and second data to be stored in the source register or an operand-designated destination register other than the source register, wherein said second instruction of the second type is applied in each of said plurality of processing elements.

7. A SIMD type microprocessor having a plurality of processor elements, wherein in each of said plurality of processor elements, first data stored in a first specific register of the processor element and second data stored in a first operand-designated source register of the processor element are compared based on a first instruction of a first type, instructions of said first type generally causing a larger data to be stored in a specific register and causing a smaller data to be stored in a source register, and said first instruction of the first type causes a larger one of said first and second data to be stored in the first specific register, and causes a smaller one of said first and second data to be stored in the first source register or a first operand-designated destination register other than the source register; and third data stored in a second specific register of the processor element and fourth data stored in a second operand-designated source register of the processor element are compared based on a second instruction of a second type, instructions of said second type generally causing a smaller data to be stored in a specific register and causing a larger data to be stored a source register, and said second instruction of the second type causes a smaller one of said third and fourth data to be stored in the second specific register, and causes a larger one of said third and fourth data to be stored in the second source register or a second operand-designated destination register other than the second source register, and wherein said first instruction of the first type is applied in each of said plurality of processing elements.

* * * * *